Figure 1:
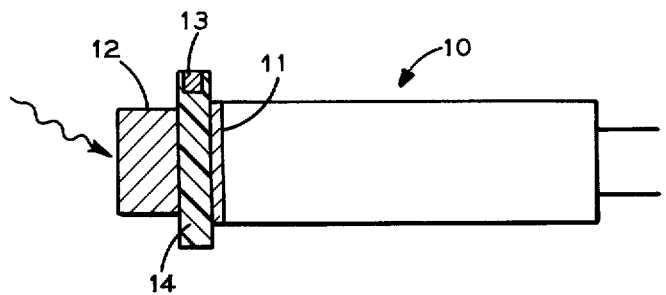

United States Patent
Chevalier et al.

[11] 3,900,731
[45] Aug. 19, 1975

[54] METHOD AND APPARATUS FOR STABILIZING THE GAIN OF A PHOTOMULTIPLIER

[75] Inventors: Philippe Chevalier, Paris; Bronislav Seeman, Meudon, both of France

[73] Assignee: Schlumberger Technology Corporation, New York, N.Y.

[22] Filed: Jan. 22, 1973

[21] Appl. No.: 326,197

[30] Foreign Application Priority Data
Jan. 24, 1972 France .................. 72.02181

[52] U.S. Cl. .............. 250/207; 250/363; 250/552; 250/206; 315/151
[51] Int. Cl.$^2$ .......................... H01J 39/12
[58] Field of Search ....... 250/205, 207, 214 R, 206, 250/552, 363, 252; 315/151, 158

[56] References Cited
UNITED STATES PATENTS

| | | | |
|---|---|---|---|
| 2,878,395 | 3/1959 | Mindheim | 250/207 X |
| 3,183,353 | 5/1965 | Baldwin | 250/207 X |
| 3,195,398 | 7/1965 | Shaw | 250/207 X |
| 3,354,773 | 11/1967 | Shreve | 250/205 X |
| 3,488,434 | 1/1970 | Farber | 250/205 X |
| 3,493,761 | 2/1970 | Brightman | 250/205 X |
| 3,600,584 | 8/1971 | Schneble | 250/207 |
| 3,604,941 | 9/1971 | Crum | 250/214 X |
| 3,675,020 | 7/1972 | Siedband et al. | 250/207 |
| 3,714,441 | 1/1973 | Kreda | 250/214 X |

OTHER PUBLICATIONS

Marlow: 15 Nuclear Instruments and Methods; Vol. 2; 1962; pp. 188–192; (North–Holland Pub. Co.).

*Primary Examiner*—Walter Stolwein

[57] ABSTRACT

A photomultiplier gain stabilization system maintains the mean output current of a photomultiplier at a constant level by compensating its variations through a modification of the illumination of its photocathode. The photocathode is coupled to a photoemissive diode, supplied with a current representative of the difference between the value of the mean current of the photomultiplier anode and a reference current value equal to at least the maximum value of the anode current.

11 Claims, 2 Drawing Figures

METHOD AND APPARATUS FOR STABILIZING THE GAIN OF A PHOTOMULTIPLIER

This invention relates to the art of stabilizing the gain of photomultipliers and more particularly to a method and apparatus for keeping the gain of a photomultiplier constant in spite of sudden variations in the illumination of its photocathode.

It is known that the gain of a photomultiplier undergoes slow variations due mainly to variations in temperature, and also fast variations due to variations in its anode current resulting from sudden modifications in the luminous energy converted by its photocathode, usually occurring when the counting rate varies rapidly during nuclear particle detection operations. These variations are very detrimental to the quality of the collected information, in particular when the photomultiplier is used for spectrometry or when it is desired to detect output pulses whose amplitude exceeds a given threshold. It is thus essential to provide a correction for these gain variations.

One approach to stabilizing the gain of a photomultiplier has been to couple its power supply voltage to the detection of a reference peak produced artificially by a source of alpha or gamma radiation associated with the scintillator or by a very stable source of light acting on the photocathode. More precisely, a signal is produced proportional to the difference between the count rates recorded for two energies corresponding to the two edges of the reference peak. The gain variations of the photomultiplier, which result in a shift of the peak, are thus represented by this signal which then adjusts the value of the high voltage applied to the photomultiplier to bring the peak to its original position. The response time of this stabilization loop is however relatively long and can only be reduced by the use of a powerful reference source which then disturbs the measurement. Consequently, this approach only allows for the compensation of slow gain variations but is not suited to the correction of transient gain variations.

It is therefore an object of the present invention to provide stabilizing means specially designed to compensate for the effects of variations in the gain of a photomultiplier resulting from sudden variations in the illumination of its photocathode.

It is another object of the invention to provide a method for stabilizing the gain of a photomultiplier by measuring the variations in its mean output current and compensating for the variations by modifying the illumination of its photocathode to keep the mean current in the photomultiplier at a constant level.

Briefly, in accordance with the present invention, the apparatus for stabilizing the gain of a photomultiplier comprises a source of light coupled with the photocathode of the photomultiplier, and means for generating a signal for controlling the intensity of the light source, representative of the difference between the value of the mean anode current of the photomultiplier and a reference value equal to at least the maximum value of the said current.

Figure 2:
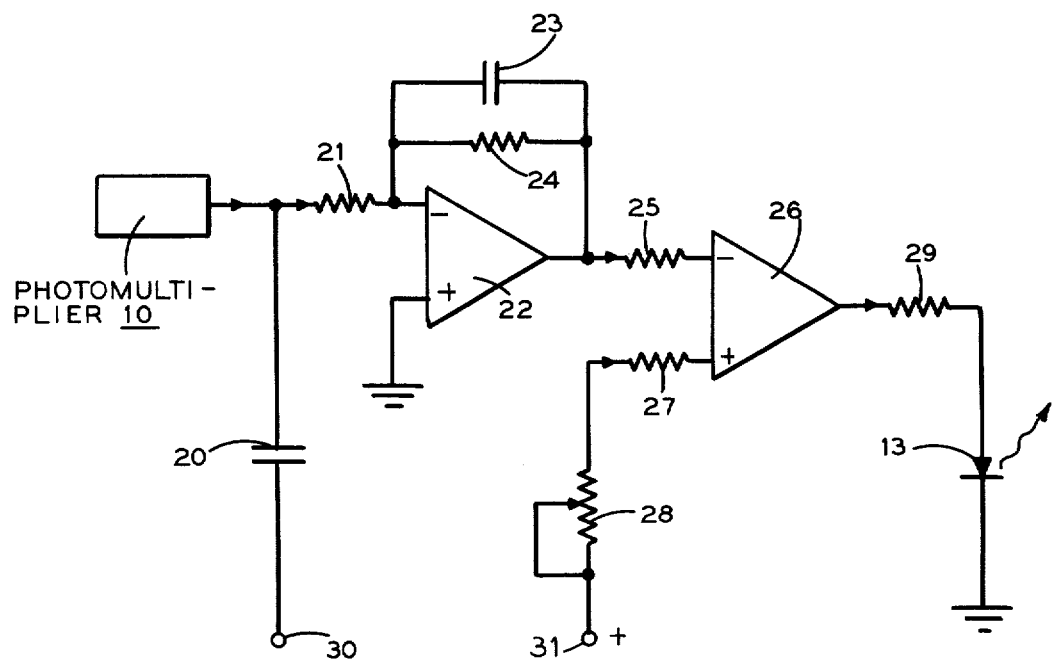

Other objects and features of the present invention will become apparent from the following detailed description of a preferred embodiment thereof, when taken in conjunction with the accompanying drawings, in which:

FIG. 1 is a schematic representation of a photomultiplier showing the coupling of the light source to the photomultiplier cathode; and FIG. 2 is a circuit diagram of a preferred embodiment of the invention.

Referring now to the drawings, in FIG. 1 there is shown schematically at 10 a photomultiplier having a photocathode 11 illuminated by a light pulse emitted by a conventional scintillator 12 when the latter receives a corpuscular radiation. The luminous energy falling on the photocathode 11 is converted into electrons which then undergo significant multiplication and give rise to the appearance at the photomultiplier anode of an electric pulse having an amplitude proportional to the energy of the radiation received by the scintillator 12.

It is known that sudden variations in the illumination of the photocathode 11 by the scintillator 12 lead to modifications in the gain of the photomultiplier 10, i.e., modifications in the ratio between the current delivered by the photocathode and the current collected at the anode. These modifications are due primarily to rapid variations in current occurring in the photomultiplier 10. In accordance with the invention, in order for the photomultiplier gain to remain constant in spite of sudden variations in the illumination of its photocathode, its mean or average current is stabilized by means of an auxiliary light source 13 and associated circuitry whose function is to compensate for the modifications in this current by reverse modifications in the illumination of the photocathode 11. The auxiliary light source 13 has a light emission field which is located very near, if not within, the field of sensitivity of the photocathode 11. This light source is preferably a photoemissive diode adapted to emit light in the green range.

To enable the photocathode 11 to be illuminated both by scintillator 12 and by auxiliary light source 13, it is optically coupled to a light conductor which may be a light conducting disc 14 interposed between the photocathode 11 and scintillator 12. Light conducting disc 14 may be formed from an epoxy resin whose refractive index is intermediate between that of scintillator 12 and photocathode 11. Disc 14 has a diameter larger than the diameter of photocathode 11 thereby allowing diode 13 to be embedded in the resin of the outer periphery thereof, outside of the light transmitting path between scintillator 12 and photocathode 11. Thus light emitted by the photoemissive diode 13 will be transmitted by disc 14 to photocathode 11.

Referring now to FIG. 2, the pulses of electrons collected on the anode of the photomultiplier 10 representative of light pulses emitted by scintillator 12 are sent via a capacitor 20 to an output terminal 30 to which suitable pulse processing circuits may be connected. Capacitor 20, of course, allows only these output pulses to pass to terminal 30.

The anode of photomultiplier 10 is connected via a resistor 21 to the inverting input of an operational amplifier 22 which has a capacitor 23 and a resistor 24 connected in parallel between its output and the inverting input to provide operation as an integrator. The non-inverting input of operational amplifier 22 is grounded. Its output is connected via a resistor 25 to the inverting input of a second operational amplifier 26, operating as a comparator, whose non-inverting input is connected via a fixed resistor 27 and adjustable resistor 28 to a suitable source of reference current represented by terminal 31. The value of the current supplied by source 31 is chosen to be equal to at least the maximum value which may be reached under normal conditions by the time averaged, pulsed anode current of the photomultiplier 10. The output of amplifier 26 is connected via resistor 29 to the anode of the photoemissive diode 13 whose cathode is grounded.

In operation, amplifier-integrator 22 produces a current representing the mean anode current of the photomultiplier 10. Amplifier-comparator 26 thus supplies the photoemissive diode 13 with a current proportional to the difference between the reference current from the source 31 and the mean anode current, equal at most to the said reference current. Thus, the illumination delivered by the diode 13 to the photocathode 11 is representative of the difference between the measured mean anode current and the reference current, thereby immediately compensating for this difference. More precisely, any increase in the mean anode current of the photomultiplier 10 causes a decrease in the current supplied to the diode 13 which compensates for this increase by decreasing its illumination of the photocathode 11. Conversely, a decrease in the mean anode current of the photomultiplier 10 causes an increase in the current in the diode 13, which automatically compensates for this decrease by increasing its illumination of the photocathode 11.

Thus, as the mean anode current of the photomultiplier 10 is kept at a constant level, the variations in gain due to variations in this current during sudden changes in the illumination of the photocathode 11 by the scintillator 12 are automatically eliminated.

Since certain changes or modifications may be made in the disclosed preferred embodiment without departing from the inventive concepts involved, it is the aim of the appended claims to cover all such changes or modifications falling within the true spirit and scope of the present invention.

What is claimed is:

1. The method of stabilizing the gain of a photomultiplier comprising, providing a source of reference current, continuously detecting variations in the mean or average anode current of the photomultiplier as compared with said reference current, illuminating the photocathode of the photomultiplier with an auxiliary light source, and continuously modifying said illumination in response to said continuously detected variations to stabilize said photomultiplier gain.

2. A system for stabilizing the gain of a photomultiplier having at least an anode and a photocathode comprising, a light source of variable intensity operative to illuminate said photocathode, means for providing a source of reference current of a selected value, means for determining the mean or average anode current of the photomultiplier, and means coupled to said light source, said anode current determining means, and said source of reference current for continuously varying the intensity of illumination of said light source in response to the difference between the mean or average value of the anode current of said photomultiplier and said selected value of reference current to stabilize said photomultiplier gain.

3. A system according to claim 2 wherein said light source is optically coupled to said photocathode.

4. A system according to claim 2 wherein said light source is a photoemissive diode.

5. A system according to claim 4 wherein said photoemissive diode is embedded in a light conducting member disposed adjacent said photocathode.

6. A system according to claim 2, wherein said light source intensity varying means is operative in response to the difference between the mean anode current and said selected reference current.

7. A system according to claim 2, wherein said light source intenisty varying means is operative in response to the difference between the average anode current and said selected reference current.

8. A system for stabilizing the gain of a photomultiplier having at least an anode and a photocathode comprising, a light source of variable intensity operative to illuminate said photocathode, means for providing a source of reference current to a selected value, means for determining the mean or average anode current of the photomultiplier, and means coupled to said light source and said anode current determining means for comparing the mean or average anode current of said photomultiplier and said selected value of reference current and operative continuously to generate a control signal representative of the difference between said mean or average anode current and said selected value of reference current for varying the intensity of illumination of said light source in response to the changes in the value of said difference to stabilize said photomultiplier gain.

9. The system of claim 8 including current integrating means connected between the anode of said photomultiplier and said comparing means.

10. The system of claim 8 wherein said light source of variable intensity is a photoemissive diode.

11. The system of claim 8 wherein the selected value of the reference current is at least the maximum value of the mean anode current.

* * * * *